(12) United States Patent
Chiba et al.

(10) Patent No.: US 7,709,122 B2
(45) Date of Patent: May 4, 2010

(54) PROTON CONDUCTIVE ELECTROLYTE MEMBRANE, SOLID POLYMER FUEL CELL AND METHOD FOR PRODUCING PROTON CONDUCTIVE ELECTROLYTE MEMBRANE

(75) Inventors: Takato Chiba, Hino (JP); Akihiko Takeda, Hino (JP)

(73) Assignee: Konica Minolta Holdings, Inc. (JP)

( * ) Notice: Subject to any disclaimer, the term of this patent is extended or adjusted under 35 U.S.C. 154(b) by 1314 days.

(21) Appl. No.: 11/011,855

(22) Filed: Dec. 14, 2004

(65) Prior Publication Data

US 2005/0153187 A1     Jul. 14, 2005

(30) Foreign Application Priority Data

Dec. 16, 2003   (JP)   ............................. 2003-417704

(51) Int. Cl.
 *H01M 8/10*   (2006.01)
(52) U.S. Cl. .......................................... 429/30; 429/33

(58) Field of Classification Search .................. 429/30, 429/33; 204/296; 29/623.3; 521/27
See application file for complete search history.

(56) References Cited

U.S. PATENT DOCUMENTS

2002/0090545 A1*   7/2002   Okochi et al. .................. 429/94

\* cited by examiner

*Primary Examiner*—Patrick Ryan
*Assistant Examiner*—Monique Wills
(74) *Attorney, Agent, or Firm*—Cantor Colburn LLP

(57) ABSTRACT

A method for producing a proton conductive electrolyte membrane in which proton conductivity is sufficiently high, methanol permeability is sufficiently low and physical strength is sufficient for reducing the thickness adequately. The production method includes: laminating a dispersion liquid containing inorganic particles and inflammable organic particles on an inflammable support, the inflammable organic particles having an average particle size of 100 to 450 nm; baking the inflammable support on which the dispersion liquid is laminated; and filling a porous membrane formed of the inorganic particles obtained by the baking with an proton conductive organic material.

6 Claims, 1 Drawing Sheet

PROTON CONDUCTIVE ELECTROLYTE MEMBRANE, SOLID POLYMER FUEL CELL AND METHOD FOR PRODUCING PROTON CONDUCTIVE ELECTROLYTE MEMBRANE

BACKGROUND OF THE INVENTION

1. Field of the Invention

The present invention relates to a proton conductive electrolyte membrane and a method for producing proton conductive electrolyte membrane, and particularly relates to a fuel cell using a proton conductive electrolyte membrane as an electrolyte, which is an electrolyte membrane for a direct methanol solid polymer fuel cell.

2. Description of Related Art

A fuel cell is a power generation device generating electricity by reacting hydrogen and oxygen. Fuel cells draw attention as an energy-saving technology dealing with global environmental problems such as the warming and the ozone layer depletion because of having an excellent character that only water is formed by the generating reaction.

There are 4 types of fuel cells, a solid polymer fuel cell, a phosphoric acid fuel cell, a molten carbonate fuel cell and a solid oxide fuel cell. Among them, the solid polymer fuel cell has advantages of a low operating temperature and a solid (polymer membrane) electrolyte. The solid polymer fuel cell is classified broadly into 2 types composed of a reformer type, which change methanol into hydrogen by using a reformer, and a direct type (DMFC: Direct Methanol Polymer Fuel Cell), which uses methanol directly without using a reformer. Because no reformer is necessary for DMFCs, DMFCs can be made smaller and lighter, and have been expected to be put into practical use as a cell or a special battery of a PDA (Personal Digital Assistance) or the like for a coming ubiquitous society.

Main components of a solid polymer fuel cell are electrode catalyst, electrolyte and a separator. A polymer proton conductive electrolyte membrane is used as the electrolyte. While proton conductive electrolyte membranes are used for application such as an ion-exchange membrane or a temperature sensor, proton conductive electrolyte membranes get attention in application as electrolyte in a solid polymer fuel cell in recent years. For example, a fluororesin membrane containing a sulfonic group, which is represented by Nafion® of DuPont Corp., has been studied in use as electrolyte in a portable fuel cell.

These fluororesin proton conductive membranes known heretofore have a defect of large methanol permeability. Development of a membrane with high proton conductivity and low methanol permeability is essential for achieving the practical use of a proton conductive membrane in new application of a solid polymer fuel cell such as a DMFC. In particular, reduction of the thickness is also necessary for improving performance as a DMFC, and also the physical strength of the membrane is required.

There is proposed various methods of impregnating a porous membrane having vacancies with a proton conductive polymer to obtain a proton conductive membrane.

JP-Tokukaihei-10-312815A discloses a composite membrane in which an ion conducting polymer is embedded within a porous substrate formed of randomly oriented individual fibres for the purpose of providing a novel composite ion exchange membrane with improved dimensional stability and handlability, and in which the ionic conductivity and reactant gas cross-over have not been compromised compared to a conventional unreinforced ion exchange membrane of the same polymer and comparable thickness.

WO00/54351 pamphlet discloses an electrolyte membrane in which pores of porous substrate substantially not swelling with methanol and water are filled with a polymer having proton conductivity for the purpose of providing an electrolyte membrane suppressing methanol permeability (crossover) as much as possible and working in a high-temperature (about 130° C. or more) condition. An inorganic material such as ceramic, glass and alumina or a heat-resisting polymer such as polytetrafluoroethylene and polyimide is used as the porous substrate. It is described that preferably the porosity of the porous substrate is 10 to 95%, the average vacancy size is 0.001 to 100 µm and the thickness is in the order of magnitude of several microns.

JP-Tokukai-2002-83514A discloses a proton conductive membrane in which a polymer having a phosphate group, a phosphonate group or a phosphinate group in the side chain is supported in vacancies of a porous membrane for the purpose of a proton conductive membrane having durability and mechanical strength. Ultrahigh molecular weight polyorefin resin and fluororesin are taken as the porous membrane. It is described that preferably the porosity of the porous membrane is 30 to 85%, the average vacancy size is 0.005 to 10 µm and the thickness is 5 to 500 µm.

For making a proton conductive electrolyte membrane capable of practical use as electrolyte of a solid polymer fuel cell, it is important factors that at least proton conductivity is sufficiently high, methanol permeability is sufficiently low and physical strength is sufficient for reducing the thickness adequately. Additionally, it is desired that mass production of proton conductive electrolyte membranes with industrially stable quality becomes possible.

Since the development described in JP-Tokukaihei-10-312815A has a tendency for distribution of holes in a porous support to be uneven, it is difficult to obtain products having sufficient performance in terms of proton conductivity. The development described in WO00/54351 pamphlet is focused on improvement of methanol permeability and working in a high temperature not less than about 130° C. The development described in JP-Tokukai-2002-83514A is focused on durability and mechanical strength. Referring to WO00/54351 pamphlet and JP-Tokukai-2002-83514A cannot make it possible to obtain a proton conductive electrolyte membrane satisfying at least 3 qualities that the proton conductivity is sufficiently high, the methanol permeability is sufficiently low and the physical strength is sufficient for reducing the thickness adequately.

SUMMARY OF THE INVENTION

Accordingly, the first object of the present invention is to provide a proton conductive electrolyte membrane that simultaneously satisfies at least three qualities that proton conductivity is sufficiently high, methanol permeability is sufficiently low and physical strength is sufficient for reducing the thickness adequately, and a method for producing a proton conductive electrolyte membrane having such excellent performance.

The second object of the present invention is to provide a solid polymer fuel cell comprising, as electrolyte, a proton conductive electrolyte membrane having such excellent performance as described above.

The third object of the present invention is, in addition to the first object of the present invention, a production method of proton conductive electrolyte membranes which are stable in quality and capable of mass production, a proton conductive electrolyte membrane obtained by the method, a solid polymer fuel cell comprising the proton conductive electrolyte membrane as electrolyte.

In accordance with the first aspect of the present invention, a method for producing a proton conductive electrolyte membrane comprises:

laminating a dispersion liquid containing inorganic particles and inflammable organic particles on an inflammable support, the inflammable organic particles having an average particle size of 100 to 450 nm;

baking the inflammable support on which the dispersion liquid is laminated; and filling a porous membrane formed of the inorganic particles obtained by the baking with a proton conductive organic material.

According to the first aspect of the present invention, forming a porous membrane through the laminating and the baking makes it possible to produce a porous membrane having a desired average pore size within the range of an average pore size of 100 to 450 nm. Additionally, because a porous membrane formed as above, which has an average pore size within the range of 100 to 450 nm, is filled with a proton conductive organic material, it is possible to produce a proton conductive electrolyte membrane having sufficiently high proton conductivity, sufficiently low methanol permeability and physical strength sufficient for reducing the thickness adequately.

Preferably, in the production method according to the first aspect of the present invention, the primary average particle size of the inorganic particles is 10 to 100 nm.

According to this production method, it is possible to produce a more excellent proton conductive electrolyte membrane having sufficiently high proton conductivity, sufficiently low methanol permeability and physical strength sufficient for reducing the thickness adequately.

Preferably, in the production method according to the first aspect of the present invention, the inorganic particles are 35 to 95% by volume and inflammable organic particles are 5 to 65% by volume when a sum of volumes of the inorganic particles and the inflammable organic particles is defined as 100% by volume.

According to this production method, compounding of such a proportion of the inorganic particles and the inflammable organic particles makes it possible to adjust the porosity of the porous membrane into the range of 10 to 70%. Therefore, it is possible to produce a further excellent proton conductive electrolyte membrane having sufficiently high proton conductivity, sufficiently low methanol permeability and physical strength sufficient for reducing the thickness adequately.

Preferably, in the production method according to the first aspect of the present invention, the laminating is performed by coating.

According to this production method, employment of the process by coating makes it possible to produce a proton conductive electrolyte membrane having stable quality in terms of proton conductivity. This is probably caused by that an isotropic porous membrane can be formed by proceeding through the process of coating.

Preferably, in the production method according to the first aspect of the present invention, the inorganic particles are colloidal silica having a primary average particle size of 10 to 100 nm.

Preferably, in the production method according to the first aspect of the present invention, the filling comprises filling the porous membrane with a polymerizable compound as the proton conductive organic material to perform in-situ polymerization of the polymerizable compound in the porous membrane.

According to this production method, the in-situ polymerization with the use of a polymerizable compound as a proton conductive organic material in a porous membrane makes it possible to uniformly fill the porous membrane with the proton conductive electrolyte membrane and to produce a proton conductive electrolyte membrane having more physical strength.

In accordance with the second aspect of the present invention, a proton conductive electrolyte membrane comprises:

a proton conductive organic material; and a porous membrane containing the proton conductive organic material, which is formed from inorganic particles obtained by baking an inflammable support on which a dispersion liquid containing the inorganic particles and inflammable organic particles is laminated, wherein the porous membrane has an average pore size of 100 to 450 nm.

Preferably, in the production method according to the second aspect of the present invention, the inorganic particles are colloidal silica having a primary average particle size of 10 to 100 nm.

Preferably, in the production method according to the second aspect of the present invention, a porosity of the porous membrane is 10 to 70%.

Preferably, in the production method according to the second aspect of the present invention, the inorganic particles are colloidal silica having a primary average particle size of 10 to 100 nm, the porous membrane has an average pore size of 100 to 450 nm and a porosity of the porous membrane is 10 to 70%.

In accordance with the third aspect of the present invention, a solid polymer fuel cell comprises:

a cathode;

an anode; and the above-described proton conductive electrolyte membrane sandwiched between the cathode and the anode.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENTS OF THE INVENTION

Figure 1:
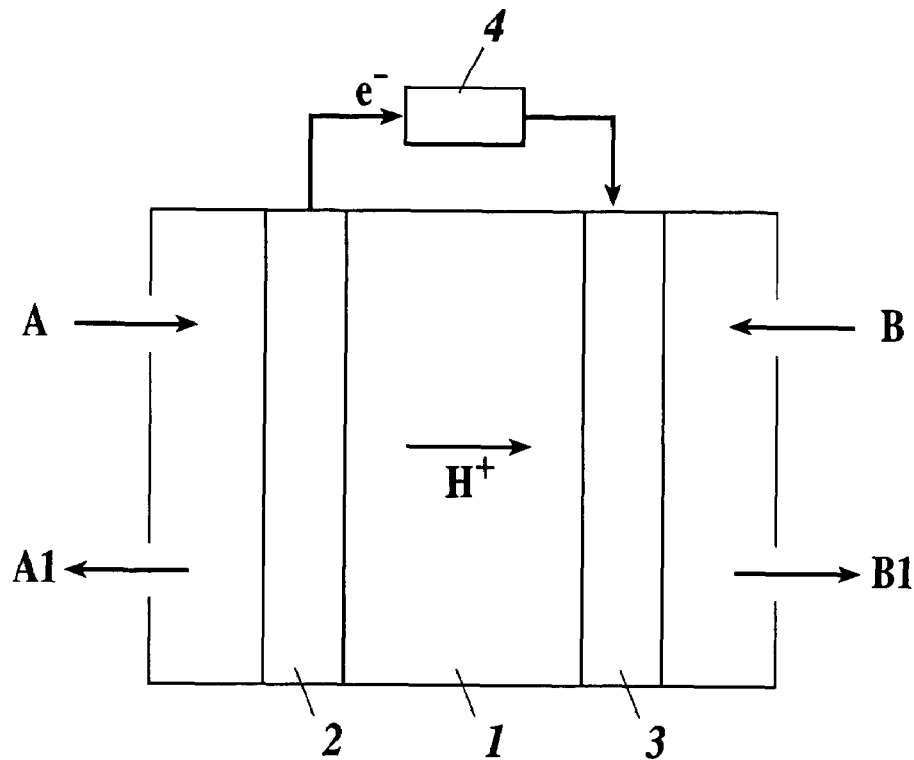
FIG. 1 is a schematic view showing an embodiment of a direct methanol solid polymer fuel cell of the present invention.

A proton conductive electrolyte membrane of the present invention comprises (1) a proton conductive organic material and (2) a porous membrane, having a structure in which the porous membrane is filled with the proton conductive organic material.

Hereinafter, materials of the above (1) and (2) will be described in detail.

(1) Proton Conductive Organic Material

A monomer or polymer having proton conductivity is used as a proton conductive organic material. A proton conductive organic material having excellent solubility and dispersibility of oxygen includes a fluorine sulfonic acid, such as trifluoromethanesulfonic acid and tetrafluoroethandisulfonic acid; a fluorine diphosphoric acid derivative, such as $(HO)_2OP(CF_2)_aPO(OH)_2$ and $(HO)_2OP(CF_2)_2PO(OH)_2$; and a fluorine sulfonyl derivative, such as $(CF_3SO_2CH_2SO_2CF_2CF_2)_2$ and $CF_3SO_2NHSO_2C_4F_9$. A proton conductive polymer having a similar property includes an ion-exchange resin having a skeleton of an organic polymer containing fluorine, such as fluorocarbon sulfonic acid resin. It is available as Nafion 112 (trade name, produced by DuPont Corp.), Nafion 117 (trade name, produced by DuPont Corp.), DOW membrane (trade name, produced by Dow Chemical Company) or the like.

In addition, a proton conductive organic material includes a sulfonated plastic electrolyte, such as sulfonated polyetherketone, sulfonated polyethersulfone, sulfonated polyetherethersulfone, sulfonated polysulfone, sulfonated polysulfide and sulfonated polyphenylene; a sulfoalkylated plastic electrolyte, such as sulfoalkylated polyetheretherketone, sulfoalkylated polyethersulfone, sulfoalkylated polyetherethersulfone, sulfoalkylated polysulfone, sulfoalkylated polysulfide and polyalkylated polyphenylene; and the like. The sulfonic acid equivalent of such an electrolyte material is approximately 0.5 to 2.0 milliequivalent/g dry resin and preferably 0.7 to 1.6 milliequivalent/g dry resin. The sulfonic acid equivalent less than 0.5 milliequivalent/g dry resin results in a large ion-conductivity resistance and more than 2.0 milliequivalent/g dry resin results in high water-solubility, unpreferably.

A fluorine electrolyte material includes copolymers of a fluorovinyl compound represented by the following formula (1) and any one of tetrafluoroethylene, hexafluoropropylene, chlorotrifluoroethylene and such a perfluoroolefin as perfluoroalkyl vinyl ether. As preferably examples of the fluorovinyl compound, for example, it is possible to use $CF_2=CFO(CF_2)_aSO_2F$ and $CF_2=CFOCF_2CF(CF_3)O(CF_2)_aSO_2F$, $CF_2=CF(CF_2)_bSO_2F$, $CF_2=CF(OCF_2CF(CF_3))_cO(CF_2)_2SO_2F$, wherein a=1 to 8, b=0 to 8 and c=1 to 5, and they are integer numbers.

$$CF_2=CF-(OCF_2CFX)_m-O_q-(CF_2)_n-A \quad (1)$$

(wherein m=0 to 3, n=0 to 12, q=0 or 1, X=F or $CF_3$ and A=a sulfonic acid type functional group.)

The average thickness of a proton conductive electrolyte membrane is ordinarily less than 500 μm, preferably less than 300 μm and more preferably 50 to 200 μm, but not limited to. The thickness can be measured by a 1/10000 thickness gage. The average thickness can be obtained by measuring any 5 points and calculating their average.

(2) Porous Membrane

A porous membrane contains the above-described proton conductive organic material and is formed of the inorganic particles that is obtained by laminating a dispersion liquid containing inorganic particles and inflammable organic particles on an inflammable support and baking the support.

Hereinafter, components constituting a porous membrane will be described in detail, respectively, and then the porous membrane will be described in detail based on them.

(2.1) Inflammable Support

A support formed by any inflammable material including paper such as filter paper, cloth such as non-woven fabric, polymer film such as polyethylene terephthalate, and the like, can be used as an inflammable support. The surface of the support is preferably smooth. If the surface of the support is smooth, the surface of a proton conductive electrolyte membrane to be obtained also becomes smooth, which makes an electrode and the proton conductive electrolyte membrane contact more closely at their interface when the proton conductive electrolyte membrane is employed as a solid polymer fuel cell. Although the surface roughness of the support is not limited, the surface roughness Rz of the surface on which a dispersion liquid containing inorganic particles and inflammable organic particles is laminated is preferably not more than 3 μm. A surface roughness Rz represents a 10 point height of irregularities corresponding to an Rz of JIS (maximum height), which is obtained by taking the mean surface of a portion sampled from a roughness surface by the reference area as a reference surface and inputting/converting distances between the average of heights of the 1st to 5th highest peaks and the average of depths of the 1st to 5th lowest valleys. For measurement, e.g. a stylus-type 3D roughness measuring instrument (SURFCOM 570A-3DF) manufactured by Tokyo Seimitsu Co., Ltd. can be used. It may be preferable to provide a backing layer on the opposite surface to that surface on which the dispersion liquid is laminated in order to prevent any curl or deflection of the support to be caused by laminating the dispersion containing inorganic particles and inflammable organic particles.

(2.2) Inorganic Particle

Inorganic particles include silica (SiO2), alumina ($Al_2O_3$), zirconium oxide ($ZrO_2$), boron oxide ($B_2O_3$), titania ($TiO_2$) and the like and hydroxides of Ti, Al, B or Zr. These compounds may be used alone or in mixture of some kinds. Silica ($SiO_2$) is preferable as a kind of the inorganic particles. Among others, amorphous silica is preferably used. While those which is produced by any one of a dry process, a wet process and an aerogel process may be used, it is most preferable to use colloidal silica produced by a wet process.

Inorganic particles preferably have the average particle size of not less than 10 nm in terms of a primary average particle size, more preferably 10 to 100 nm, further preferably 10 to 50 nm. Considering the primary average particle size and the kind, colloidal silica having a primary average particle size of 10 to 100 nm is preferably used as inorganic particles. A "primary average particle size" of inorganic particles is an average of measured values that are obtained by measuring major axes of 1000 particles at random observed with a scanning electron microscope.

(2.3) Inflammable Organic Particle

While organic particles of any material which will burn away finally can be used as inflammable organic particles, what is not swollen with a solvent as a dispersion medium to be used for the dispersion liquid is preferable. It is preferable to use water as a dispersion medium in view of safety. Therefore polymer beads of acrylic resin, styrene resin, styrene/acrylic resin, styrene/divinylbenzene resin, polyester resin, urethane resin or the like, which are not dissolved in nor swollen with water, are preferably used as inflammable organic particles. The inflammable organic particles have an average particle size of 100 to 450 nm, preferably 200 to 300 nm.

(2.4) Porous Membrane

A porous membrane is formed through steps of laminating a dispersion liquid containing inorganic particles and inflammable organic particles on an inflammable support and baking the inflammable support. In the step, inorganic particles stick to each other to form a membrane and portions occupied by inflammable organic particles vanish away to form innumerable pores having an average pore size of approximately 100 to 450 nm in the membrane of inorganic particles. Owing to such a phenomenon, innumerable pores having an average pore size of approximately 100 to 450 nm are formed in the porous membrane. Preferably, a membrane having an average pore size of 200 to 300 nm is used as the porous membrane. The average pore size can be measured with the use of, for example, Poresizer 9310 manufactured by Shimadzu Corp. by mercury porosimetry.

A proton conductive electrolyte membrane of the present invention is obtained by impregnating the above-described porous membrane with the above-described proton conductive organic material. The proton conductive electrolyte membrane has a good balance in sufficiently high proton conductivity, sufficiently low methanol permeability and physical strength sufficient for reducing the thickness adequately.

The porosity of the porous membrane is preferably 10 to 70%, more preferably 20 to 40%. Adjusting the porosity of the porous membrane into this range provides a better balance for sufficiently high proton conductivity, sufficiently low methanol permeability and sufficient physical strength for reducing the thickness adequately.

Porosity can be calculated from mass W (g) per unit area S ($cm^2$), average thickness t (μm) and density d ($g/cm^3$) by the following formula:

$$\text{Porosity (\%)} = (1 - (10^4 \times W/(S \times t \times d))) \times 100$$

When the sum of the volumes of inorganic particles and inflammable organic particles is defined as 100% by volume, a proton conductive electrolyte membrane according to the present invention has inorganic particles of 35 to 95% by volume and inflammable organic particles of 5 to 65% by volume. By constituting the proton conductive electrolyte membrane at such a proportion, the porosity of the porous membrane can be adjusted within the above-described range.

Next, a method for producing a proton conductive electrolyte membrane according to the present invention will be described.

The method for producing a proton conductive electrolyte membrane comprises: (1) a preparing step for preparing a dispersion liquid containing inorganic particles and inflammable organic particles, (2) a laminating step for laminating the prepared dispersion liquid on an inflammable support after the preparing step, (3) a baking step for baking the inflammable support on which the dispersion liquid is laminated after the laminating step and (4) a filling step for filling a porous membrane formed of the inorganic particles obtained by the baking step with a proton conductive organic material after the baking step. A proton conductive electrolyte membrane can be produced through these steps.

Hereinafter, the above-described steps of (1) to (4) will be described in detail.

(1) Preparing Step

The proportion of inorganic particles and inflammable organic particles to be used is as described above. As for the concentration of the dispersion liquid, preparation is performed so that the solid content concentration is 5 to 80%, preferably 10 to 40%.

An aqueous solvent is preferable as the dispersion medium. While various known materials such as water or alcohols can be used as an aqueous solvent, water or a mixed solvent having water as a main component is preferably used.

As a dispersing agent for dispersing inorganic particles and inflammable organic particles, it is possible to use various surfactants such as higher-fatty-acid salt, alkyl sulfate, alkyl ester sulfate, alkyl sulfonate, sulfosuccinate, naphthalene sulfonate, alkylphosphate, polyoxyalkylene alkyl ether phosphate, polyoxyalkylene alkylphenyl ether, polyoxyethylene polyoxypropylene glycol, glycerin ester, sorbitan ester, polyoxyethylene fatty acid amide and amine oxide.

A dispersion method for dispersing includes methods of using a ball mill, a sand mill, an attritor, a roll mill, an agitator, a Henschel mixer, a colloid mill, an ultrasonic homogenizer, a pearl mill, a wet jet mill, a paint shaker or the like. These dispersion methods may be used alone or in combination suitably.

(2) Laminating Step

As the laminating step, there are a method of filtering a dispersion liquid through a membrane filter by using a vacuum suction filter, depositing a layer containing inorganic particles and inflammable organic particles on the filter paper and drying the layer, another method of coating an inflammable support with a dispersion liquid and drying it, and the like. In the laminating step, it is preferable to use the method of coating an inflammable support with a dispersion liquid. A well-known coating method, e.g. a roll coating method, a rod bar coating method, an air-knife coating method, a spray coating method, a curtain coating method, an extrusion method, or the like, is adopted as the coating method.

(3) Baking Step

In the baking step (for forming a porous membrane formed of inorganic particles), the inflammable support on which the dispersion liquid containing inorganic particles and inflammable organic particles is laminated is heat-treated by an electric oven in a nitrogen atmosphere. The heat treatment can be performed by using an electric oven comprising a heating element, e.g. molybdenum silicide. The heat treatment is performed in not more than 1000° C., preferably from 400 to 900° C. The heat time can be set depending on the size of a target porous membrane. Specifically, for example, the time should be set for about 2 hours. Too long heat time causes excessive sinter and probably leads to reduction of the average pore size. Cooling is performed after the baking step. Although the Cooling temperature is not limited particularly, the porous membrane is preferably cooled to room temperature in terms of ease of treatment. The rates of temperature increase and decrease in the heat treatment for obtaining a porous membrane can be suitably set. Preferably, both of the rates of temperature increase and decrease are set for 200 to 300° C./h.

(4) Filling Step

A method for filling a porous membrane formed of inorganic particles with a proton conductive organic material is not especially limited. For example, vacancies of a porous membrane can be filled with a proton conductive organic material by a method of coating the porous membrane with a proton conductive polymer solution, a method of impregnating the porous membrane with a proton conductive polymer solution or the like. In these case, use of ultrasonic or reduction of pressure can make it easier to fill the vacancy with the proton conductive organic material.

In the filling step, also it is possible to use a polymerizable compound (a polymerizable proton conductive organic material) as a proton conductive organic material and fill vacancies of a porous membrane with the polymerizable compound to perform in-situ polymerization in the porous membrane. Specifically, the pore surface of the porous membrane is activated by energy of plasma, ultraviolet rays, electron beam, gamma rays or the like. Subsequently, a monomer having an ion-exchange group is caused to be attached or applied to the surface to cause graft-polymerization reaction on the surface and inside vacancies of the porous membrane and fill the vacancies with the proton conductive organic material substantially. Otherwise, another method, e.g. performing plasma polymerization by evaporating a polymerizable proton conductive organic material, is applied. Polymerization can be performed by adding a polymerization initiator to a polymerizable proton conductive organic material and heating it, or the like.

According to the above production methods, it is possible to produce a proton conductive electrolyte membrane simultaneously satisfying at least three qualities that proton conductivity is sufficiently high, methanol permeability is sufficiently low and physical strength is sufficient for reducing the thickness adequately. The proton conductive electrolyte membrane simultaneously satisfies at least three qualities that proton conductivity is sufficiently high, methanol permeability is sufficiently low and physical strength is sufficient for reducing the thickness adequately.

A proton conductive electrolyte membrane produced through the above-described respective steps can be used for a fuel cell. Among other fuel cells, the proton conductive electrolyte membrane is preferably used for a methanol fuel cell, particularly preferably used for a direct methanol solid polymer fuel cell. A solid polymer fuel cell having a proton conductive electrolyte membrane produced by the above-described production method as electolyte is improved in reduction of electromotive force due to methanol and has high output.

Next, a direct methanol solid polymer fuel cell will be described in reference to FIG. 1. FIG. 1 is a schematic view showing one embodiment of a direct methanol solid polymer fuel cell using the above-described proton conductive electrolyte membrane as an electrolyte membrane.

In FIG. 1, symbol 1 indicates an electrolyte membrane, symbol 2 indicates an anode (fuel electrode), symbol 3 indicates a cathode (air electrode) and symbol 4 indicates an external curcuit. A methanol solution A is used as fuel. As shown in FIG. 1, a solid polymer fuel cell according to the present invention comprises the anode 2, the cathode 3 and an electrolyte membrane 4 and has a structure such that the electrolyte membrane 4 is sandwiched between the anode 2 and the cathode 3.

In the anode 2, methanol reacts with water to generate carbon dioxide and proton ($H^+$) and release electron ($e^-$). The proton ($H^+$) passes through the electrolyte membrane 1 and goes to the cathode 3, and the electron ($e^-$) flows through the external circuit. On the other hand, a solution A1 containing carbon dioxide in which the methanol component is reduced is discharged from the system. The reaction in the anode 2 is represented by the following formula:

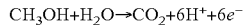

$$CH_3OH+H_2O \rightarrow CO_2+6H^++6e^-$$

In the cathode 3, oxygen in air B, the proton ($H^+$) passed through the electrolyte membrane and the electron ($e^-$) from the external circuit react to generate water. On the other hand, air B1 containing water in which oxygen is reduced is discharged from the system. The reaction in the cathode 3 is represented by the following formula:

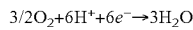

$$3/2O_2+6H^++6e^- \rightarrow 3H_2O$$

The whole reaction of the fuel cell is as the follow formula:

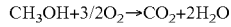

$$CH_3OH+3/2O_2 \rightarrow CO_2+2H_2O$$

For the anode 2, one having a structure known conventionally can be used. For example, the one comprises, from the side of the electrolyte membrane, a catalyst layer and a support supporting the catalyst layer. Also for the cathode 3, one having a structure known conventionally can be used. For example, the one comprises, from the side of the electrolyte membrane, a catalyst layer and a support supporting the catalyst layer.

As the catalysts of the anode 2 and the cathode 3, known catalysts can be used. For example, it is possible to use a noble metal catalyst, such as platinum, palladium, ruthenium, iridium or gold, and an alloy, such as platinum-ruthenium or iron-nickel-cobalt-molybdenum-platinum.

A catalyst layer preferably contains a material of electronic conductor (electric conductor) for the purpose of improving electric conductivity. In view of electronic conductivity and contact resistance, as the electronic conductor (electric conductor), it is preferable to use, without limitation, an inorganic electrically conductive material. Among others, carbon black, graphitic or carbonaceous carbon material, metal or semimetal are pointed to. Here, as carbon material, carbon black such as channel black, thermal black, furnace black and acetylene black, is preferably used in view of electronic conductivity and specific surface area. In particular, it is used as electronic conductor (electric conductor) supporting catalyst such as platinum-supporting carbon.

Methods for uniting a solid polymer electrolyte membrane and an electrode to produce a MEA (membrane electrode assembly) include a method of mixing platinum catalyst powder supported on carbon particles with polytetrafluoroethylene suspension, coating carbon paper with the mixture, forming a catalyst layer by heat treatment, coating the catalyst layer with the same electrolyte solution as an electrolyte membrane, and hot pressing it with the electrolyte membrane to unify. Alternatively, there are a method of coating platinum catalyst powder with the same electrolyte solution as the electrolyte membrane in advance, a method of coating the electrolyte membrane with catalyst paste, a method of electroless plating of the electrolyte membrane with an electrode, a method of adsorbing a complex ion of the platinum group on the electrolyte membrane and then reducing the ion, and the like.

A single cell comprises a fuel distribution plate (separator) and an oxidant distribution plate (separator) as collector in which a groove is formed for forming a fuel flow pass and an oxidant flow pass are arranged outside an assembly of the electrolyte membrane and the electrode produced as above. A fuel cell is constituted by laminating a plurality of the single cells through cooling plates and the like.

EXAMPLE

Hereinafter the present invention will be described more minutely on the basis of examples, but not limited thereto.

Example 1

(1) Production of Proton Conductive Electrolyte Membrane (1.1) Preparation of Porous Membrane (1.1.1) Preparation of Porous Membrane No. 1

Mixture of polystyrene particles (trade name: Polystyrene 90 produced by Seradyn Corp., average particle size of 83 nm) and colloidal silica (trade name: Snowtex 10 produced by Nissan Chemical Corp., primary average particle size of 20 nm), which contained 20% of polystyrene particles and 80% of colloidal silica by volume, was agitated and dispersed in a dilute aqueous solution of a surfactant by using a high speed homogenizer. The concentration of the dispersion liquid was brought to 20% by mass.

Subsequently, filtration was performed with a membrane filter having a pore size of 0.025 μm by using a vacuum suction filter manufactured by Advantec Corp. The filter paper was dried and put into a constant temperature oven of 800° C. to be baked, and thus "Porous membrane No. 1" was prepared.

(1.1.2) Preparation of Porous Membranes No. 2 to 12

"Porous membranes No. 2 to 12" were prepared in the same way as Porous membrane No. 1, except that polystyrene particles and colloidal silica were changed in Porous membrane No. 1 as Table 1.

However, Polystyrene 100, Polystyrene 200, Polystyrene 300, Polystyrene 400, and Polystyrene 450 (all produced by Seradyn Corp.) were used for polystyrene particles having an average particle size of 112 nm, 210 nm, 304 nm, 421 nm and 464 nm, respectively. Snowtex 20, Snowtex XL and Snowtex MP (all produced by Nissan Chemical Corp.) were used for colloidal silicas having a primary average particle size of 30 nm, 50 nm and 100 nm, respectively.

1.1.3) Measurement of Pore Sizes and Porosities of Porous Membranes No. 1 to 12

The pore sizes and porosities of Porous membranes No. 1 to 12 were described in Table 1.

A porosity was calculated from mass W (g) per unit area S ($cm^2$), average thickness t (μm) and density d ($g/cm^3$) by the following formula:

Porosity (%)=(1−($10^4$×$W$/($S$×$t$×$d$)))×100

Average pore sizes were measured with the use of Poresizer 9310 manufactured by Shimadzu Corp. by mercury porosimetry. Measured values were rounded to the nearest 10.

TABLE 1

| Porous membrane No. | Polystyrene particles Average particle size (nm) | % by volume | Colloidal silica Primary average particle size (nm) | % by volume | Pore size (nm) | Porosity (%) | Remarks |
| --- | --- | --- | --- | --- | --- | --- | --- |
| 1 | 83 | 20 | 20 | 80 | 80 | 20 | Comparative |
| 2 | 83 | 30 | 50 | 70 | 80 | 30 | Comparative |
| 3 | 112 | 10 | 20 | 90 | 110 | 10 | Present invention |
| 4 | 112 | 30 | 50 | 70 | 110 | 30 | Present invention |
| 5 | 210 | 20 | 20 | 80 | 210 | 20 | Present invention |
| 6 | 210 | 30 | 30 | 70 | 210 | 30 | Present invention |
| 7 | 304 | 20 | 20 | 80 | 300 | 20 | Present invention |
| 8 | 304 | 30 | 30 | 70 | 300 | 30 | Present invention |
| 9 | 421 | 30 | 30 | 70 | 420 | 30 | Present invention |
| 10 | 421 | 50 | 50 | 50 | 420 | 50 | Present invention |
| 11 | 421 | 40 | 100 | 60 | 420 | 60 | Present invention |
| 12 | 464 | 30 | 50 | 70 | 460 | 30 | Comparative |

(1.2) Production of Proton Conductive Electrolyte Membrane

Porous membranes No. 1 to 12 produced above were filled with proton conductive organic material to produce "proton conductive electrolyte membrane (Electrolyte membranes No. 1 to 12)", respectively.

2-acrylamide-2-methylpropanesulfonic acid, N,N'-methylene-bisacrylamide as a crosslinking agent and AIBN (N,N'-azobisisobutylonitrile) as a polymerization initiator were mixed at a weight ratio of 100:20:1 into isopropyl alcohol: water=1:1. Porous membrane was dipped in the mixture liquid. It was slowly heated in this state and kept at 60° C. for 2 hours, and additionally slowly heated and kept at 80° C. for 2 hours. This procedure was repeated three times to produce a proton conductive electrolyte membrane. The average thickness of the proton conductive electrolyte membrane was 50 μm. The average thickness was obtained by measuring any 5 points with a 1/10000 thickness gage and calculating their average. Nafion 112 (manufactured by DuPont Corp.) was also prepared as control.

(2) Evaluation of Proton Conductive Electrolyte Membrane (2.1) Proton Conductivity A proton conductive membrane or a film was left under an environment adjusted to temperature of 25° C. and relative humidity of 50% for 4 hours. Subsequently, by using an LCR meter HP 4284A of Hewlett-Packard Company, a 1 cm-square sample of the membrane or film having a predetermined thickness was sandwiched between platinum electrodes and measured by the complex impedance method in condition of temperature of 25° C. and relative humidity of 50%. The proton conductivity was calculated by using a resistance value of the real part when a reactance value of the imaginary part was extrapolated to zero.

(2.2) Methanol Permeability

Figure 2:
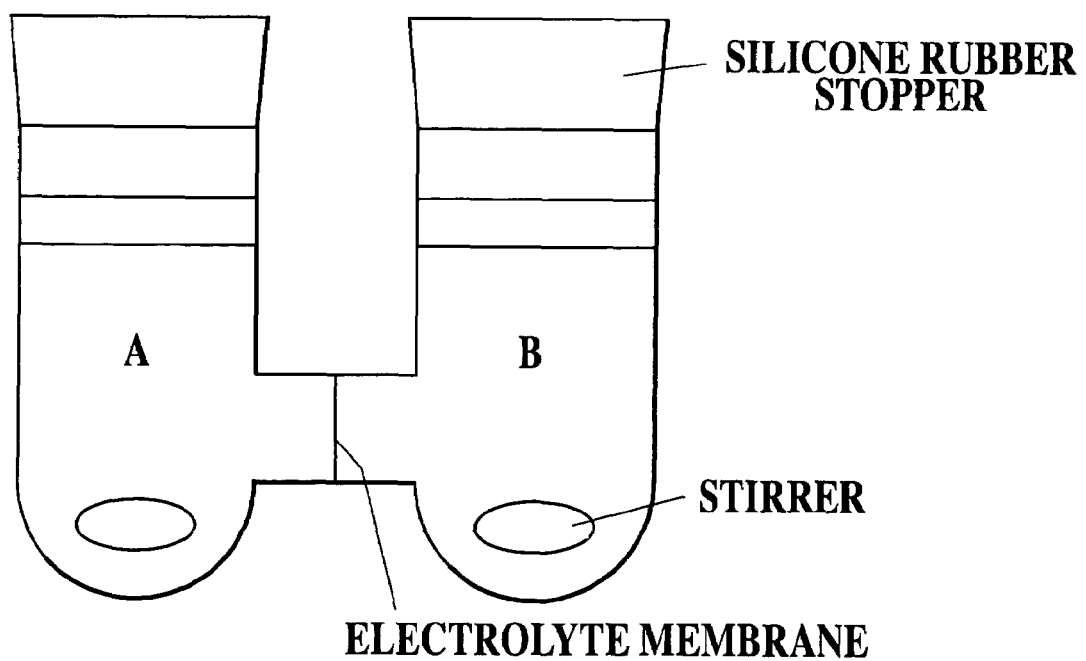
FIG. 2 is a schematic view showing an H-shaped cell for evaluating methanol permeability.

A proton conductive electrolyte membrane was sandwiched in an H-shaped cell in FIG. 2 to measure the permeability coefficient of methanol permeating from 2M methanol aqueous solution containing 0.1 M sulfuric acid placed in A cell to pure water in B cell.

(2.3) Membrane Strength

A proton conductive electrolyte membrane was sandwiched between Teflon (R) plates to be hot-pressed at 120° C. for 2 minutes in the following condition. Previously and subsequently, the amount of permeating methanol was measured. A pressure at which methanol moved quickly and membrane was destroyed was 4.9×$10^4$ Pa for a sample represented "X", 9.8×$10^4$ Pa for a sample represented "Δ" and 19.6×$10^4$ Pa for a sample represented "O". It was determined that "Δ" and "O" were enough for practical use.

(2.4) Results of Evaluation

Results of evaluation is shown in Table 2.

TABLE 2

| Electrolyte membrane No. | Proton conductivity S/cm | Methanol permeability coefficient ($kg/m^2 h$) | Membrane strength | remarks |
| --- | --- | --- | --- | --- |
| 1 | 2.2 × $10^{-2}$ | 9.8 × $10^{-5}$ | Δ | Comparison |
| 2 | 2.3 × $10^{-2}$ | 1.2 × $10^{-4}$ | Δ | Comparison |
| 3 | 3.5 × $10^{-2}$ | 3.6 × $10^{-5}$ | O | Present invention |
| 4 | 3.7 × $10^{-2}$ | 7.8 × $10^{-5}$ | Δ | Present invention |
| 5 | 3.9 × $10^{-2}$ | 3.2 × $10^{-5}$ | O | Present invention |
| 6 | 3.7 × $10^{-2}$ | 4.0 × $10^{-5}$ | O | Present invention |
| 7 | 4.2 × $10^{-2}$ | 4.2 × $10^{-5}$ | O | Present invention |
| 8 | 4.0 × $10^{-2}$ | 5.0 × $10^{-5}$ | O | Present invention |

TABLE 2-continued

| Electrolyte membrane No. | Proton conductivity S/cm | Methanol permeability coefficient (kg/m²h) | Membrane strength | remarks |
|---|---|---|---|---|
| 9 | $3.6 \times 10^{-2}$ | $4.5 \times 10^{-5}$ | ○ | Present invention |
| 10 | $2.9 \times 10^{-2}$ | $2.0 \times 10^{-4}$ | Δ | Present invention |
| 11 | $2.8 \times 10^{-2}$ | $1.9 \times 10^{-4}$ | Δ | Present invention |
| 12 | $3.0 \times 10^{-2}$ | $2.3 \times 10^{-4}$ | X | Comparison |
| Nafion | $5.6 \times 10^{-2}$ | $3.6 \times 10^{-4}$ | — | Control |

From results in Table 2, it is found that the electrolyte membrane (Electrolyte membranes No. 3 to 11) according to the present invention have higher proton conductivities, lower methanol permeability and adequate physical strength for practical use as compared to comparative electrolyte membrane (Electrolyte membranes No. 1, 2 and 12). Among Electrolyte membranes No. 3 to 11, particularly, Electrolyte membranes No. 5 to 8 are excellent in proton conductivity and methanol permeability. It is understood that Nafion as a sample for control has a high proton conductivity and yet has a defect of a high methanol permeability.

Example 2

The same dispersion liquids as Porous membranes No. 3 to 11 prepared in Example 1 were prepared. Respective dispersion liquids were applied onto a polyethylene terephthalate support by using a bar coater so that the thicknesses after drying became 50 μm, and were dried to produce "Porous membranes No. 203 to 211".

In the same way as Example 1, the membranes were filled with a proton conductive organic material to produce proton conductive electrolyte membranes and measure the proton conductivities, methanol permeabilities and membrane strengths.

Results are shown in Table 3.

TABLE 3

| Electrolyte membrane No. | Proton conductivity S/cm | Methanol block percentage (%) | Membrane strength | Remarks |
|---|---|---|---|---|
| 203 | $4.2 \times 10^{-2}$ | $3.0 \times 10^{-5}$ | ○ | Present invention |
| 204 | $4.5 \times 10^{-2}$ | $7.6 \times 10^{-5}$ | Δ | Present invention |
| 205 | $4.6 \times 10^{-2}$ | $3.0 \times 10^{-5}$ | ○ | Present invention |
| 206 | $4.6 \times 10^{-2}$ | $3.0 \times 10^{-5}$ | ○ | Present invention |
| 207 | $4.9 \times 10^{-2}$ | $4.0 \times 10^{-5}$ | ○ | Present invention |
| 208 | $5.2 \times 10^{-2}$ | $4.3 \times 10^{-5}$ | ○ | Present invention |
| 209 | $4.6 \times 10^{-2}$ | $4.0 \times 10^{-5}$ | ○ | Present invention |
| 210 | $3.9 \times 10^{-2}$ | $1.3 \times 10^{-4}$ | Δ | Present invention |
| 211 | $3.6 \times 10^{-2}$ | $1.8 \times 10^{-4}$ | Δ | Present invention |

In Example 2, the laminating step for laminating a dispersion liquid is a step by coating. By comparing Table 2 and Table 3, it is understood that membranes produced by coating are excellent in proton conductivity and methanol permeability. In particular, it is also understood that the effect is great for proton conductivity.

Example 3

Membrane electrode assemblies (MEA) were produced with the use of the proton conductive electrolyte membranes (Electrolyte membranes No. 1 to 12) by the following method.

(1) Manufacture of Electrode

After polytetrafluoroethylene (PTFE) water-repellent treatment was applied to carbon fiber cross media, the media were coated with a carbon black dispersion liquid containing 20% by weight of PTFE and baked to produce an electrode substrate. An anode catalyst coating liquid comprising Pt—Ru supporting carbon and a Nafion (produced by DuPont Corp.) solution was applied onto the electrode substrate and dried to produce an anode. A cathode catalyst coating liquid comprising Pt supporting carbon and a Nafion (produced by DuPont Corp.) solution was applied onto the electrode substrate and dried to produce a cathode. (2) Production of Membrane Electrode Assemblies (MEAs) and Evaluation of Current-voltage Characteristics of the MEAs Each of Proton conductive electrolyte membranes (Electrolyte membranes No. 1 to 12) produced in Example 1 and Nafion 112 was sandwiched between the anode and the cathode and hot-pressed, thereby "Membrane electrode assemblies (MEAs) (MEAs No. 1 to 12)" were produced. Each of the membrane electrode assemblies (MEAs) was sandwiched by separators and an aqueous solution of 3% methanol was flowed to the anode side and the air was flowed to the cathode side to activate a fuel cell and evaluate the current-voltage characteristics. Current densities at a voltage of 0.4V are shown in Table 4.

TABLE 4

| MEA No. | Current density (A/cm²) | Remarks |
|---|---|---|
| 1 | 0.16 | Comparison |
| 2 | 0.16 | Comparison |
| 3 | 0.17 | Present invention |
| 4 | 0.17 | Present invention |
| 5 | 0.23 | Present invention |
| 6 | 0.22 | Present invention |
| 7 | 0.23 | Present invention |
| 8 | 0.21 | Present invention |
| 9 | 0.19 | Present invention |
| 10 | 0.18 | Present invention |
| 11 | 0.17 | Present invention |
| 12 | 0.16 | Comparison |
| Nafion | 0.15 | Control |

From results in Table 4, it is understood that the membrane electrode assemblies (MEAs) (MEAs No. 3 to 11) according to the present invention have a large current density as compared to the comparative membrane electrode assemblies (MEAs) (MEAs No. 1, 2 and 12) and Nafion 112 (produced by DuPont Corp.).

The entire disclosure of Japanese Patent Application No. Tokugan 2003-417704 filed on Dec. 16, 2003 including specification, claims, drawings and summary are incorporated herein by reference in its entirety.

What is claimed is:

1. A method for producing a proton conductive electrolyte membrane comprising:

laminating a dispersion liquid containing inorganic particles and inflammable organic particles on an inflammable support, the inflammable organic particles having an average particle size of 100 to 450 nm;

baking the inflammable support on which the dispersion liquid is laminated; and filling a porous membrane formed of the inorganic particles obtained by the baking with an proton conductive organic material;

wherein the inflammable organic particles are one selected from a group consisting of acrylic resin, styrene resin, styrene/acrylic resin, styrene/divinylbenzene resin, polyester resin and urethane resin;

the inflammable support is one selected from a group consisting of filter paper, non-woven fabric, and polymer film; and the proton conductive organic material is one selected from a group consisting of: a fluorine sulfonic acid derivative, a fluorine diphosphoric acid derivative, a fluorine sulfonyl derivative, an ion-exchange resin having a skeleton of an organic polymer containing fluorine, a sulfonated plastic electrolyte, sulfoalkylated polyetheretherketone, sulfoalkylated polyethersulfone, sulfoalkylated polyetherethersulfone, sulfoalkylated polysulfone, and sulfoalkylated polysulfide.

2. The method of claim 1, wherein the inorganic particles have a primary average particle size of 10 to 100 nm.

3. The method of claim 1, wherein the inorganic particles are 35 to 95% by volume and inflammable organic particles are 5 to 65% by volume when a sum of volumes of the inorganic particles and the inflammable organic particles is defined as 100% by volume.

4. The method of claim 1, wherein the laminating is performed by coating.

5. The method of claim 1, wherein the inorganic particles are colloidal silica having a primary average particle size of 10 to 100 nm.

6. The method of claim 1, wherein the filling comprises filling the porous membrane with a polymerizable compound as the proton conductive organic material to perform in-situ polymerization of the polymerizable compound in the porous membrane.

* * * * *